United States Patent [19]

Jones

[11] 3,887,898
[45] June 3, 1975

[54] WELL LOGGING SYSTEM USING 3 PHASE AC POWER SUPPLY

[75] Inventor: John M. Jones, Houston, Tex.
[73] Assignee: Texaco Inc., New York, N.Y.
[22] Filed: Aug. 20, 1973
[21] Appl. No.: 389,857

[52] U.S. Cl. .......... 340/18 R; 340/18 FM; 321/5 B; 321/45 R; 181/102; 307/13
[51] Int. Cl. ............................................. G01v 1/40
[58] Field of Search ............... 321/45 R, 5 B, 43; 340/18 R, 18 FM; 73/DIG. 6; 181/.5 TS; 307/13, 38

[56] References Cited
UNITED STATES PATENTS

| | | | |
|---|---|---|---|
| 2,942,112 | 6/1960 | Hearn | 340/18 FM |
| 3,408,551 | 10/1968 | Kuba | 321/45 R |
| 3,413,539 | 11/1968 | Lopitzsch | 321/45 R |
| 3,448,299 | 6/1969 | Hierholzer et al. | 321/45 R |
| 3,459,956 | 8/1969 | Brock | 340/18 R |
| 3,474,320 | 10/1969 | Chandler | 321/5 |

Primary Examiner—Maynard R. Wilbur
Assistant Examiner—N. Moskowitz
Attorney, Agent, or Firm—T. H. Whaley; C. G. Ries; William J. Beard

[57] ABSTRACT

An improved system for logging tools useful in well bores traversing earth formations is disclosed in which a surface generated direct current is transmitted via a logging cable to a downhole tool and inverted to a three phase alternating current which can be used for powering a three phase synchronous motor in a downhole logging tool. In the logging tool a logic circuit converts clocking pulses to phase related signals. The phase related signals are used to operate bridge inverter circuits for developing alternating current signals which are in a three phase relationship.

7 Claims, 5 Drawing Figures

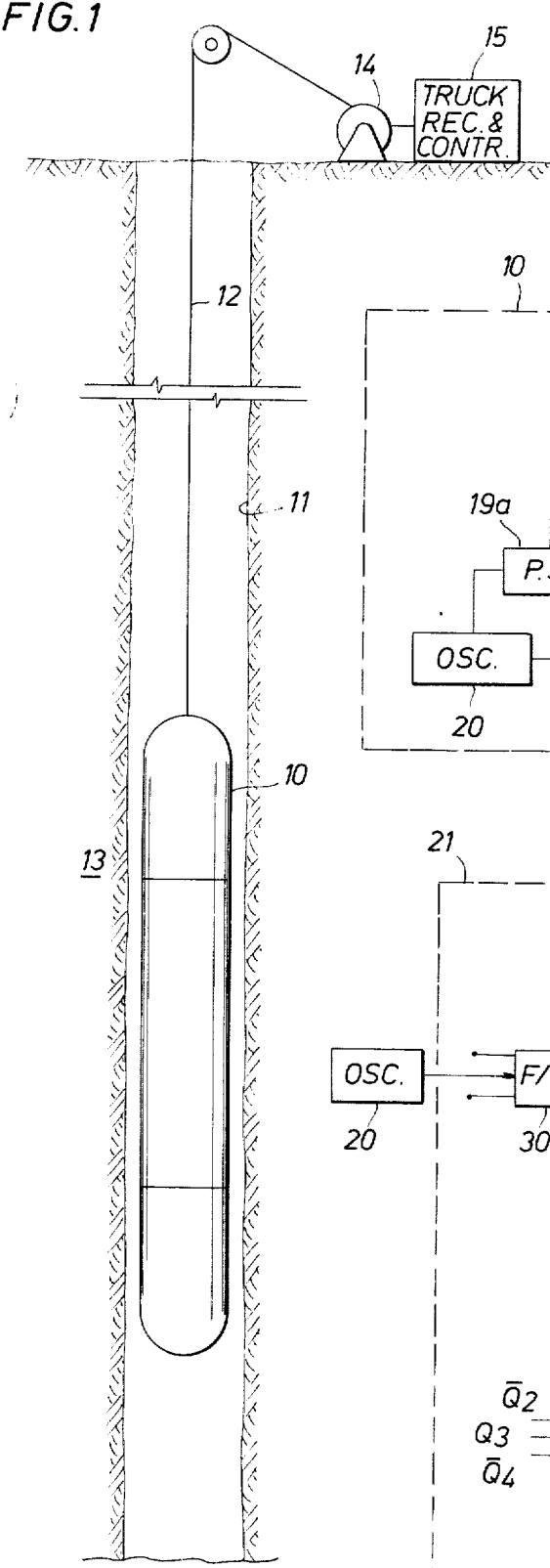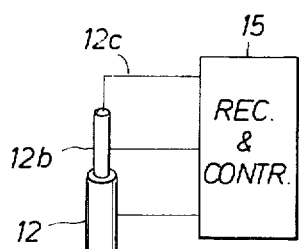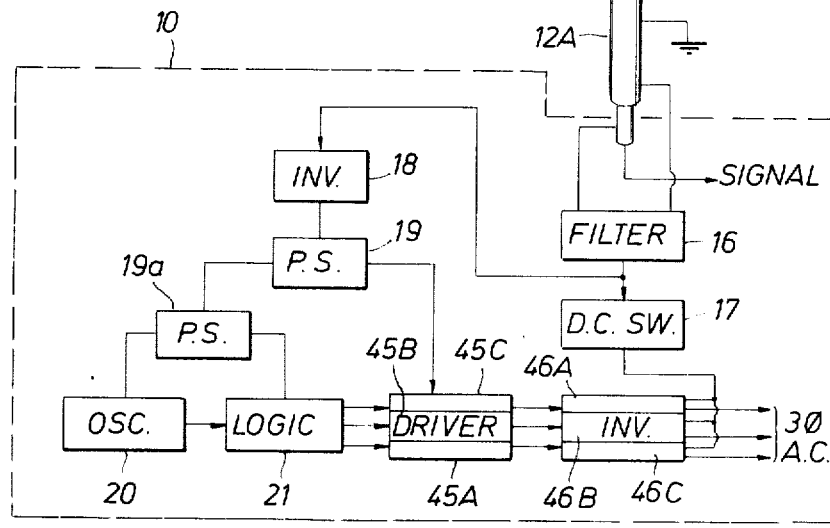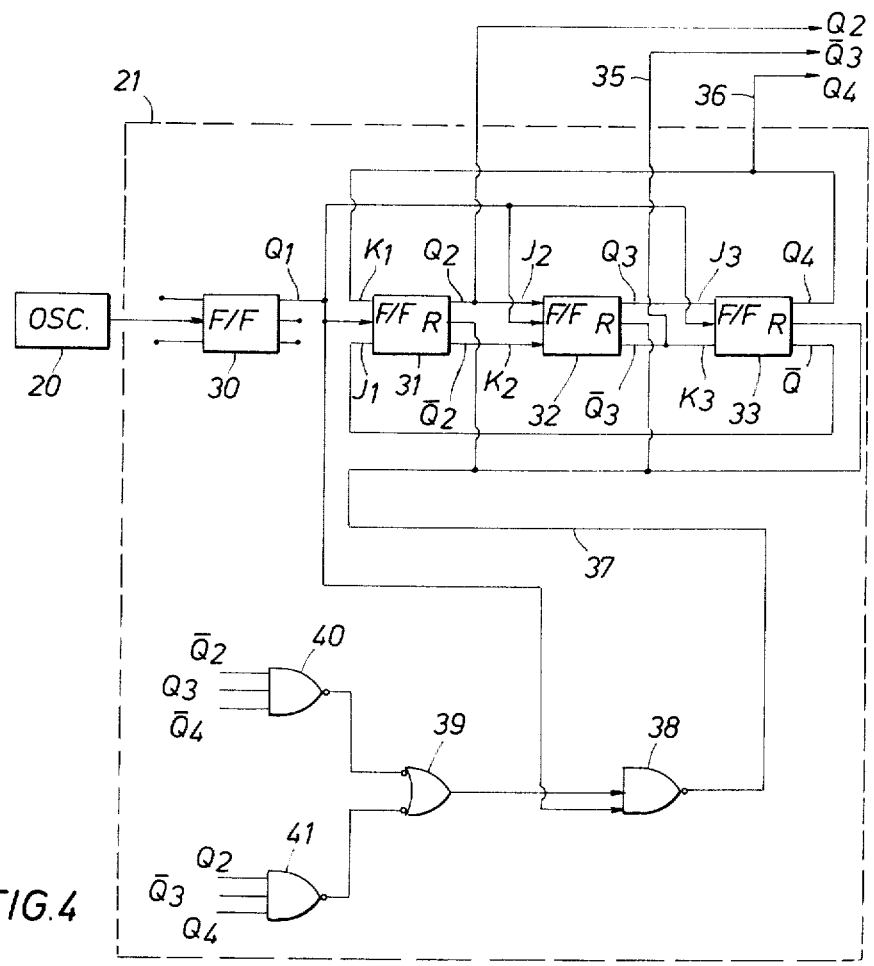
FIG.1  FIG.2  FIG.4

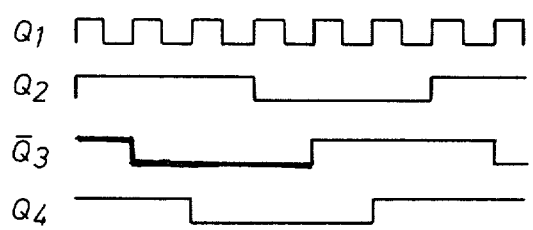
FIG.5
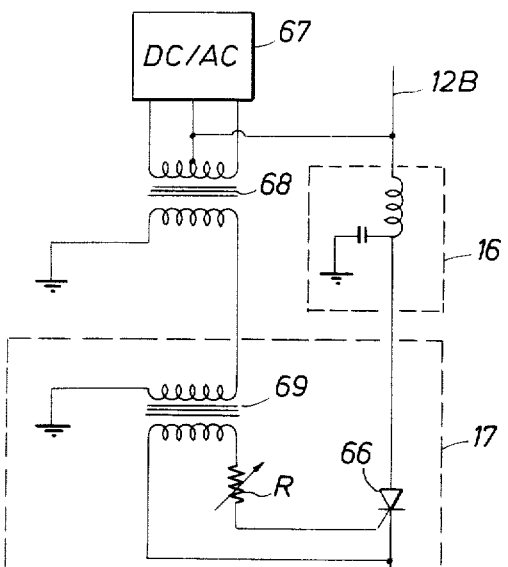
FIG.3
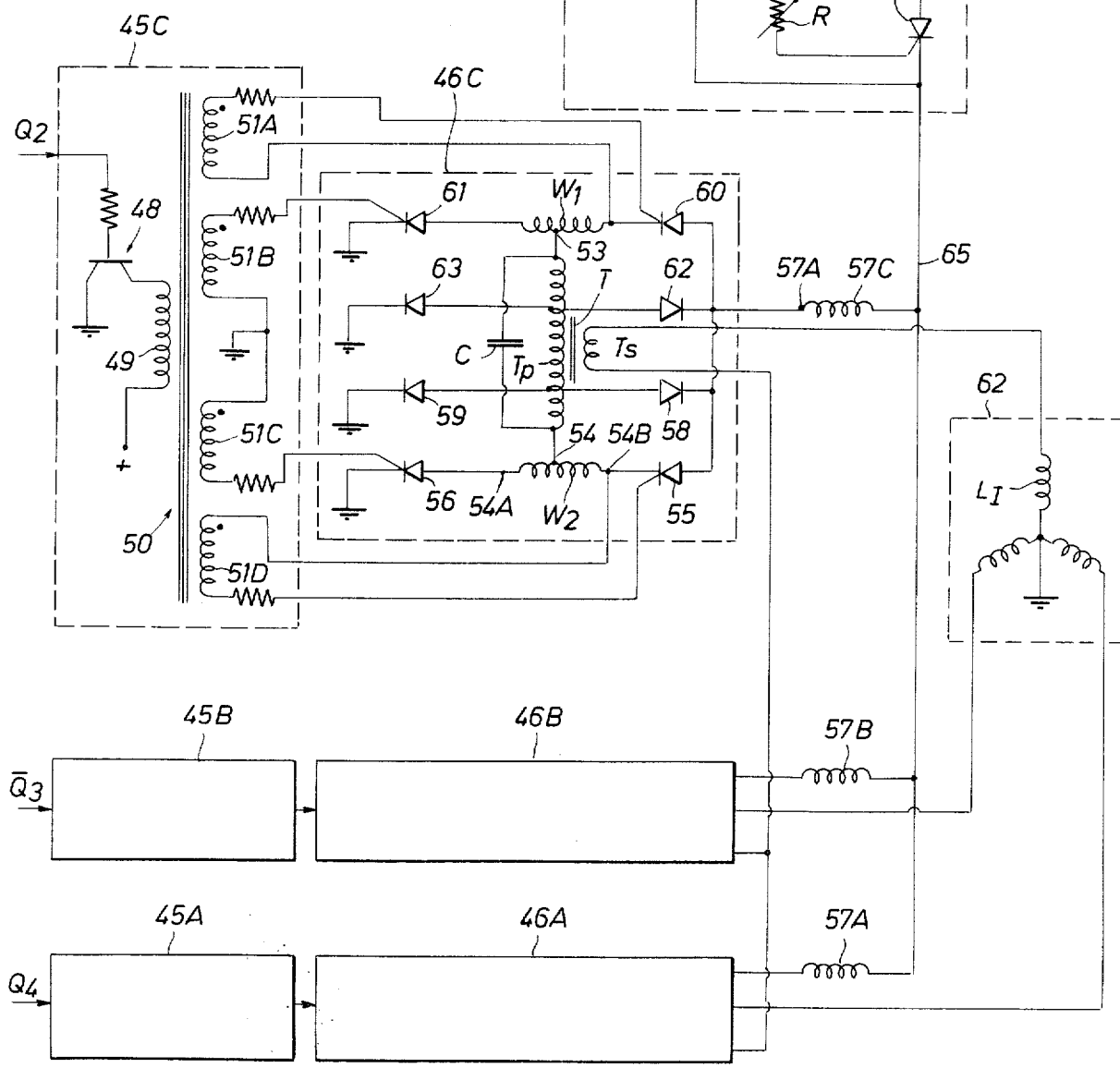

WELL LOGGING SYSTEM USING 3 PHASE AC POWER SUPPLY

BACKGROUND OF THE INVENTION

This invention relates to logging tools for use in well bores which traverse earth formations, and more particularly, to a system for converting in a logging tool a direct current to a three phase alternating current.

In the logging of wells traversing earth formations, from time to time, it has been suggested to use an alternating current motor in a well bore tool. So far as the applicant is concerned, there has been no practical realization of this concept until the advent of this invention.

SUMMARY OF THE INVENTION

The present invention permits the use of direct current from surface equipment over a single pair of cable conductors. In the well tool, the direct current is inverted in a three phase relationship by employing three inverters and independently actuating the inverters in a three phase relationship. The three phase relationship is developed by a logic circuit which is supplied by clocking pulses. A switch circuit is also used to prevent short circuits when starting up.

BRIEF DESCRIPTION OF THE DRAWINGS

FIG. 1 depicts a well logging tool disposed in a borehole;

FIG. 2 depicts a schematic representation of electronic circuitry embodying the present invention;

FIG. 3 depicts a schematic representation of the inverter circuitry of the present invention;

FIG. 4 depicts a schematic representation of the logic circuitry of the present invention; and FIG. 5 depicts waveforms of electrical signals generated in the logic circuitry of FIG. 4.

DESCRIPTION OF THE PREFERRED EMBODIMENTS

Referring now to FIG. 1, a logging tool 10 is shown as suspended in a well bore 11 by an electrical armored cable 12. The well bore traverses earth formations 13 and the logging tool 10 is moved through the well bore by the cable 12 which is controlled by a surface winch or spool 14. Parameters of the earth formations or well bore are detected by the well tool 10 in terms of electrical signals which are transmitted via the cable 12 to surface recording and control equipment 15. Power and signal controls are transmitted from the surface controls equipment 15 to circuits in the logging tool. The foregoing arrangement is standard and well known. As the logging tool 10 is moved along the well bore 11, the electrical signals representative of well bore parameters are received at the earth's surface and recorded as a function of depth by the equipment 15. At the same time, the equipment 15 provides power for the operation of electrical circuitry in the tool 10 as well as any necessary or required control signals.

As shown in FIG. 2 of the drawings, the cable 12 can be a tri-axial cable consisting of three concentric electrical conductors 12a, 12b, and 12c, which are electrically insulated relative to one another. The conductors 12a - 12c are disposed within a load supporting armor wire sheath (not shown) in a well known manner for supporting the logging tool in the well bore. The cable connects to the recording and control equipment 15 at the earth's surface and to the well tool 10 in the well bore.

The present invention is concerned with a system in a logging tool for development in the logging tool 10 of a three phase alternating current power from a direct current supplied via the cable 12 from the earth's surface. The three phase A.C. power can be employed, for example, to drive a three phase A.C. synchronous motor in the logging tool.

In the system of the present invention, direct current is supplied via cable conductors 12a and 12b to a direct current filter 16. The remaining conductor 12c can be used for transmission of signals representative of borehole parameters. The filter 16 is used to remove any ripple in the waveform which might occur. The D.C. power from the filter 16 is supplied to a D.C. switch 17. As will become apparent from the discussion to follow, the D.C. switch 17 supplies a D.C. voltage and current to inverters 46 (a–c) only after the system is conditioned for operation, and the D.C. voltage and current is converted to three phase alternating current in the inverters 46(a–c). The D.C. power from the filter 16 is also supplied to a single phase D.C./A.C. inverter 18 which develops alternating current power for the power supplies 19 and 19a as well as other power supplies (not shown) which are used in the tool. The power supply 19, for example, can provide 10 volt D.C. power while the power supply 19a provides 5 volt D.C. power.

In the system of the present invention, an oscillator 29 provides electrical clocking pulses to a logic circuit 21. The logic circuit 21 supplies three phase related rectangularly-shaped pulses at re-occurring time intervals respectively to three driver circuits 45(a–c). The phase relation between the shaped pulses is 120° so that a time interval defined as 360° includes three separate shaped pulses which have positive and negative portions of equal time duration and the onset of a change of condition, i.e., from negative to positive for each shaped pulse is at 120° with respect to the corresponding event for the other two shaped pulses. The driver circuits 45(a–c) provide a power amplification function and the shaped pulses are respectively supplied to separate inverter circuits 46(a–c). The shaped pulses control the respective inverter circuits to invert the direct current supplied by the switch 17 into a three phase alternating current output which, for example, can be used to drive a shychronous motor.

The oscillator circuit 20 preferably provides an electrical output of clocking pulses at a frequency of 4.8KH$_z$. The oscillator 20 is a conventional solid state unijunction relaxation oscillator where the output signals are squared by saturating a transistor switch. Sensitors and diodes are used in a well known manner for temperature stabilization to 125° C, for example.

The oscillator 20 supplies the clocking pulses to the logic circuit 21 which converts the pulse input into three phase related output signals where the phase relationhip is 120°. The logic circuit 21, as shown in FIG. 4, is in the form of a ring counter using four J – K type solid state flip-flops 30, 31, 32 and 33. The truth table for any one of the J – K flip-flops is as follows:

| Condition | J | K | Q |
| --- | --- | --- | --- |
| 1. | 0 | 0 | $Q_N$ |
| 2. | 0 | 1 | 0 |

-Continued

| Condition | J | K | Q |
|---|---|---|---|
| 3. | 1 | 0 | 1 |
| 4. | 1 | 1 | $\overline{Q_N}$ | where $Q_n$ in the value of the preceding Q value and $\overline{Q_n}$ is the value of the preceding Q value inverted.

When the oscillator 20 supplies its clock pulses to the flip-flop 30 of the logic circuit 21, the flip-flop 30 provides (by means of a conductor path) output pulses $Q_1$ (see FIG. 5) which are supplied to each of the clock inputs of the flip-flops 31, 32 and 33, and to an AND circuit 38. The flip-flop 31 has $K_1$ and $J_1$ inputs and outputs $Q_2$ and $\overline{Q_2}$. The outputs $Q_2$ and $\overline{Q_2}$ are respectively supplied to the $J_2$ and $K_2$ inputs of the flip-flop 32. The output $Q_2$ provides, via a conductor 34, a first phase related output signal (see FIG. 5). The flip-flop 32 has its outputs $Q_3$ and $\overline{Q_3}$ respectively supplied to the $J_3$ and $K_3$ inputs of the flip-flop 33. The output $\overline{Q_3}$ provides, via a conductor 35, the second phase output signal which is 240° out-of-phase with respect to the first $Q_2$ phase signal (see FIG. 5). The flip-flop 33 has its outputs $Q_4$ and $\overline{Q_4}$ respectively supplied to the $K_1$ and $J_1$ inputs of the flip-flop 31. The output $Q_4$ provides, via a conductor 36, the third phase output which is 120° out-of-phase with respect to the first and second phase signals (see FIG. 5). The flip-flops 31 – 33 have resets R to keep the alignment of the circuits in the 120° phase-relationship as described. If the phase output relationship is wrong, the flip-flops are reset to initiate a proper phase related sequence. The resets R are coupled by a conductor 37 to an AND circuit 38 which is supplied with the $Q_1$ signals and the output from an OR circuit 39. So long as the OR circuit 39 output is constant, the resets R are keyed to the pulses $Q_1$. The OR circuit 39 is supplied with outputs from a pair of AND circuits 40 and 41. The AND circuit 40 receives inputs $\overline{Q_2}$, $Q_3$, and $\overline{Q_4}$ from the flip-flops 31 – 33, while the AND circuit 41 receives inputs $Q_2$, $\overline{Q_3}$, and $Q_4$ from the flip-flops 31 – 33. Whenever the phase relationship of the Q outputs to either of the AND circuits 40 or 41 is altered, the resets R of the flip-flops are operated to correct the phase relationship automatically.

The 120° phased outputs $Q_2$, $\overline{Q_3}$ and $Q_4$ from the logic circuit 21 are respectively supplied to the power driver circuits 45(a-c). A typical power driven circuit 45c as shown in FIG. 3, includes a transistor switch 48 with its collector coupled to the primary winding 49 of a pulse transformer 50. There are four secondary windings 51(a-d) for the transformer 50. The polarity of the windings is illustrated by the dots on the drawings where a dot indicates a common polarity relationship to other windings similarly marked. The driver 45c serves to provide power amplification and shaping of input signals. The four secondary windings are used to control an inverter 46c. Each of the circuits 45a and 45b is similarly constructed to circuit 45c. The driver circuits amplify the signals for control of the inverter circuits.

Each of the inverter circuits is identical and thus a description of one circuit will suffice for the other. An inverter 46c, as shown in FIG. 3 includes a transformer T which has a primary coil winding $T_p$ and a secondary coil winding $T_s$. The secondary coil winding $T_s$ is coupled to a motor inductor coil $L_1$. The alternating current power to the motor coil $L_1$ is developed by switching a D.C. voltage through opposite ends of the primary winding $T_p$.

A capacitor C is coupled in parallel across the winding $T_p$ and one end of the winding is connected at a center tap at 53 to an inductor $W_1$. The other end of the coil winding $T_p$ is connected at a center tap at 54 to an inductor $W_2$. One end of the inductor $W_2$ is coupled via a SCR 55 to an electrical ground. The SCR 55 is coupled to one end of an inductor coil 57, which is connected to a conductor 65, which carries the direct current to be inverted to the inverters 46(a-c). The transformer winding $T_p$ is tapped at 58a near its end (at $0.15_n$ turns) and diodes 58 and 59 are connected respectively to the inductor 57 and to the electrical ground. The other side of the inverter includes the inductor $W_1$, which has one end coupled to a silicon controlled rectifier 60, which is coupled to the inductor coil 57, and its other end coupled to a SCR 61 which connects to the electrical ground. The transformer winding $T_p$ is tapped near its end (at $0.15_n$ turns) and diodes 62 and 63 are respectively connected to the inductor 57 and to the electrical ground.

The SCRs are controlled by the secondary windings 51(a-d) of the transformer 50. Winding 51a is coupled to SCR 60; winding 51b is coupled to SCR 61; winding 51c is coupled to SCR 56; and winding 51d is coupled to SCR 55. The arrangement is such that when SCR 60 and 56 are conducting the SCR 55 and 61 are cut-off. When SCR 60 and SCR 56 are cut-off, the SCR 55 and 61 conduct. In the operation of the inverter, the D.C. voltage on the transformer winding $T_p$ is switched through opposite ends of the winding. In the secondary coil $T_s$ and in a load inductance $L_1$, the switched D.C. voltage appears as an alternating current waveform.

The SCR devices are switched on by a positive gate to cathode signal voltage and are turned off by reversing the current until the SCR regains its capacity to block forward voltage. Referring to FIG. 3, when SCR 61 and SCR 55 are conducting, the SCR 60 and SCR 56 are blocking. In this state, there is a negative gate to cathode voltage being applied to the SCR 60 and 56. The voltage on the gates of the SCR 61 and 55 is positive. With SCR 55 "on" and SCR 56 "off", the capacitor C charges up to the voltage supplied via coil 57 and to the voltage at point 57a. The voltage at point 54 and one side of the capacitor C is less than the voltage at point 57a by the voltage drop across one-half of the inductor $W_2$. The winding $T_p$ is clamped at the point 58a to a maximum voltage equal to the voltage at point 57a less the voltage drop across the diode 58. To change states, the voltage on the gates of the SCRs are switched. While SCR 56 is switched on by a positive pulse, SCR 55 depends upon a commutating action to be switched off.

The commutating action for SCR 55 occurs in the following manner. When SCR 56 turns on, the point 54a falls to zero voltage. Since the voltage on the capacitor C cannot change instantaneously, the voltage of point 57a occurs across the portion of the inductor between points 54 and 54a. An equal voltage is induced in the winding $W_2$ between points 54 and 54b which places an inverse voltage on the SCR 55, turning it off. The current originally flowing in the SCR 55 and inductor between points 54 and 54b cannot be instantly changed to zero, and in order to preserve the stored energy in the inductance, the capacitor C furnishes the required current.

Relative to the diodes 58 and 59, at the time when the voltage at point 54 reaches a ground potential, the voltage across the commutating inductance is zero and the current through the SCR 56 has built up to a maximum value. By connecting the rectifiers 58 and 59 to the transformer winding $T_p$, the energy is fed to the direct current supply by the diode 58. The SCR 56 is commutated off in a manner similar to that described with respect to SCR 55 when SCR 55 is switched on. The other half of the inverter operates in the same manner except that it is inverted.

For selection of commutation components C and W for the inverter, in general, the following equations will be helpful:

$$C = \frac{T_{oMAX} L_{to}}{0.425 E_b} \quad (1)$$

$$L = \frac{T_{oMAX} E_b}{0.425 I_{to}} \quad (2)$$

where $t_{omax}$ is equal to the maximum turn off time specified for the SCRs, $E_d$ equals the direct current supply voltage, $I_{to}$ is equal to the current through the SCRs just before commutation, and $L$ is the inductance value between the midpoint 54 and one end of the inductor.

In summary of an inverter operation, a pair of windings 51a and 51c are used to control the SCR 60 and 56 while the windings 51b and 51d are used to control the SCR 61 and 55. The current flow through the transformer winding $T_p$ alternates in one direction by operation of the SCR 60 and 56 and in an opposite direction by virtue of operation of the SCR 61 and 55. The secondary winding $T_s$ of the transformer T reflects an alternating current waveform to the motor 62.

The inductors 57(a-c) couple the respective inverters 46(a-c) to the D.C. switch 17. The D.C. switch includes a SCR 66 coupled to the conductor 65 and to the filter 16. The filter 16 includes a conventinoal inductor and capacitor where the inductor is coupled to the armor cable conductor 12b to receive the D.C. input. The conductor 12b is also coupled to a single phase D.C. to A.C. inverter 67 which provides, via transformers 68 and 69 an alternating current to the control gate of the SCR 66. The SCR 66 remains turned off and prevents the application of D.C. power to the inverters 46(a-c) until the alternating currents to the inverters 46(a-c) are of sufficient amplitude to switch the SCR 55, 56, 60 and 61. This is important because if a D.C. voltage is applied to a SCR before they are being triggered with the proper amplitude and phase sequence, one SCR could fail to be turned off at the proper time and this would leave a short circuit across the D.C. supply. The D.C. switch must also open before the amplitude of the D.C. voltage has increased to what can be termed a critical amplitude. If the switch opens after this amplitude, a high surge of starting current will be drawn by the motor and this can cause the voltage of the system to drop below the amplitude necessary to maintain the output of the gate firing circuits. The SCR is switched on when the signal waveform from the transformer 69 increases to sufficient amplitude to fire the SCR 66. The resistor R can be adjusted so that the SCR 66 fires at any selected D.C. voltage.

As shown in FIG. 1, a logging tool 10 can be traversed through a well bore 11 and a recorder 15 can receive the signals via a conductor 12c and record such signals as a function of depth. At the same time direct current from the control unit 15 can be provided via conductors 12a and 12b to the well tool 10. In the well tool, the direct current is filtered to remove oscillations and applied to various single phase D.C. to A.C. inverters and to a D.C. switch 17. The D.C. switch 17 prevents the direct current from reaching the inverters 46(a-c) until the inverters 46(a-c) have reached a certain operational level which precludes the burning out of SCRs in the inverter. Clocking pulses from the oscillator 20 are converted into three separate phase related control signals. The three phase related control signals are used to operate three inverters which respectively produce alternating currents having a predetermnied phase relationship. In the logic circuit, means are provided to reset the relationship should the predetermined phase relationship be disrupted.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A logging tool for use in a well bore where an electrical direct current is supplied via an armored logging cable to such tool,
   said logging tool including a fluid tight housing for containing a system for converting such electrical direct current into three phase alternating current, said system comprising
   plural inverter means including plural transformer means for receiving direct current and conductor paths for providing current flow paths in opposite directions through primary windings of said transformer means, said current flow conductor paths being adapted for receiving such direct current, means in said current flow conductor paths for alternating the application of such direct current to said transformer means,
   means for generating clocking pulses and means for converting said clocking pulses into at least three phase related control signals, and
   means responsive to said control signals for electrically operating said alternating means in a timed relationship for producing at least three, phase related alternating current outputs for input to said primary windings of said transformer means.

2. The apparatus of claim 1 wherein said inverter means includes three independent inverter means, each having transformer means and each having current flow conductor paths and wherein said electrically operating means includes means for providing three phase related control signals to said inverter means, each phase related signal being identical to the other but displaced by a 120° phase relationship to the other two control signals.

3. A logging tool for use in a well bore traversing earth formations, comprising:
   a liquid tight housing sized for passage through a well bore,
   an electrical system in said housing including
   means for filtering a direct current input,
   means for generating clocking pulses at a constant frequency, means for converting said clocking pulses into three control signals each having a control time interval displaced in time relative to one another by an equal amount to provide three cyclic control signals having a timed relationship, separate amplifying means for receiving each of said control signals and for amplifying said signals, separate inverter means respectively coupled to each of said amplifying means and to said filtering means for respectively inverting a direct current input and producing an alternating current outputs have a three phase relationship, and three phase motor means coupled to said inverter means.

4. The apparatus of claim 3 wherein said converting means includes a ring counter means and control means for receiving outputs from said counter means, said control means being coupled to reset means on said counter means for resetting said counter means whenever said outputs from said counter means change their relationship.

5. The apparatus of claim 3 and further including a gate means disposed between said filtering means and said inverter means, said gate means blocking direct current from said inverter means until a predetermined input direct current is attained.

6. The apparatus of claim 5 wherein said inverter means includes a transformer, current flow conductor paths connected to the primary windings of said transformer, gate means in said flow conductor paths, said gate means being responsive to said control signals for alternately applying direct current in opposite directions across said primary windings.

7. The apparatus of claim 6 and further including three phase alternating current motor means coupled to said inverter means.

* * * * *